(12) United States Patent
Kitahara et al.

(10) Patent No.: US 7,583,564 B2
(45) Date of Patent: Sep. 1, 2009

(54) PIEZOELECTRIC ACTUATOR AND ELECTRONIC EQUIPMENT WITH PIEZOELECTRIC ACTUATOR

(75) Inventors: Joji Kitahara, Suwa (JP); Akihiro Sawada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 11/473,307

(22) Filed: Jun. 23, 2006

(65) Prior Publication Data

US 2007/0008829 A1  Jan. 11, 2007

(30) Foreign Application Priority Data

Jun. 24, 2005 (JP) ............................. 2005-184454
Apr. 25, 2006 (JP) ............................. 2006-119951

(51) Int. Cl.
*G04F 5/00* (2006.01)
*H01L 41/00* (2006.01)

(52) U.S. Cl. ................... 368/157; 368/155; 310/323.16; 310/311

(58) Field of Classification Search .................... 368/29, 368/157, 255; 310/323.01, 323.02, 323.12, 310/323.16
See application file for complete search history.

(56) References Cited

U.S. PATENT DOCUMENTS

2004/0017131 A1 * 1/2004 Sawada et al. .............. 310/311
2004/0227433 A1   11/2004 Miyazawa et al.
2005/0082950 A1    4/2005 Zakoji
2005/0184621 A1 *  8/2005 Kitahara et al. ............. 310/311

FOREIGN PATENT DOCUMENTS

| JP | H07-049388 A | 2/1995 |
| JP | 2004-166340 A | 6/2004 |
| JP | 2004-239408 A | 8/2004 |
| JP | 2004-301627 A | 10/2004 |

* cited by examiner

*Primary Examiner*—Vit W Miska
*Assistant Examiner*—Sean Kayes
(74) *Attorney, Agent, or Firm*—Global IP Counselors, LLP

(57) ABSTRACT

To provide a piezoelectric actuator whereby impact resistance can be greatly improved without complicating the design or causing a reduction in drive efficiency.

When a piezoelectric actuator 31 is incorporated into a main plate 14, an arm part 513 of a vibrator 50 is disposed across from a protrusion 144 via spaces SP1, SP2 having specific dimensions. With the presence of these spaces SP1, SP2, a free end FR moves freely within the spaces SP1, SP2 during driving, but a vibrating part 511 is captured at the free end FR by the protrusion 144 when external impact is applied, and the vibrating part 511 can therefore be prevented from moving beyond the dimensions of the spaces. Resistance against impact from falling can thereby be easily and greatly improved without reducing the drive efficiency, and the usual difficulty of reconciling both drive efficiency and impact resistance can be resolved.

16 Claims, 8 Drawing Sheets

PIEZOELECTRIC ACTUATOR AND ELECTRONIC EQUIPMENT WITH PIEZOELECTRIC ACTUATOR

FIELD OF THE INVENTION

The present invention relates to piezoelectric actuator, and to an electronic device comprising the same.

BACKGROUND OF THE INVENTION

In conventional practice, piezoelectric actuators for driving driven objects by the vibration of a vibrator having a piezoelectric element have been used in the calendar mechanisms of timepieces, the zoom mechanisms or auto-focus mechanisms of cameras, the drive mechanisms of mobile toys, and the like.

With timepieces, cameras, mobile toys, or other electronic devices provided with such piezoelectric actuators, the operation may be affected by the fact that the vibrator of the piezoelectric actuator and the rotor or other objects driven by the piezoelectric actuator may be brought out of alignment by external impact that occurs when the device is dropped, and damages may occur if the impact is severe. Particularly, the component that supports and secures the vibrator is generally thin and fragile so as not do disrupt the vibration of the vibrator Therefore, problems are encountered in that the deformation of the vibrator due to impact causes this supporting part to break or causes the wiring provided to the supporting part to be cut.

Methods in which the vibrator is merely supported in a direct manner in order to provide an impact-resistant structure for the piezoelectric actuator are subject to problems in that the support interferes with vibration and reduces drive efficiency.

Therefore, in one proposed impact-resistant structure in which the vibrator is not directly supported, the rotor and the vibrator are prevented from separating during impact. This is achieved by providing a spring member that pushes the rotor towards the vibrator, and providing a pin to a position adjacent to the spring member to regulate the movement of the spring member (Patent Reference 1).

The pin in Patent Reference 1 is provided so as to come into contact with the spring member in cases in which the rotor moves a specific distance in the direction away from the vibrator during impact, and also so as to maintain the state of contact between the piezoelectric actuator and the rotor. The pin is also disposed at a position whereby the rotor will not collide with any other members in cases in which the rotor separates from the vibrator during impact, and whereby the meshing between the rotor and the teeth of the next transmission wheel will not disengage.

[Patent Reference 1] Japanese Laid-open Patent Application No. 2004-301627 (Specification, paragraph no. [0013], FIG. 2)

SUMMARY OF THE INVENTION

[Problems the Invention is Intended to Solve]

However, in cases in which a pin such as the one described in Patent Reference 1 is used, design proves difficult because it is difficult to determine a position suitable for positioning the pin.

Also, in Patent Literature 1, the movement of the rotor can be regulated during impact and damage to the rotor can be prevented, but the movement of the vibrator is not directly regulated. Therefore, there still remains the possibility that the vibrator will separate from the rotor and be damaged as a result of impact.

In view of these problems, an object of the present invention is to provide a piezoelectric actuator whereby design can be facilitated and impact resistance can be greatly improved without causing a reduction in drive efficiency; and to provide an electronic device comprising this piezoelectric actuator.

[Means for Solving These Problems]

The piezoelectric actuator of the present invention is a piezoelectric actuator that has piezoelectric elements to which electrodes are provided, and that comprises a vibrator vibrated by the application of voltage to the electrodes; wherein the vibrator has the piezoelectric elements and a reinforcing member that are stacked on each other; the reinforcing member has a free end that has the piezoelectric elements disposed thereon and that has a protuberance in contact with a driven object, and also has a fixed part that is fixedly attached to an attachment part to which the piezoelectric actuator is attached; and the free end, when in a state in which no impact is applied to the attachment part from the outside, is disposed in relation to the attachment part via spaces that have specific dimensions in the stacking direction of the piezoelectric elements and the reinforcing member, and in an in-plane direction that intersects with the stacking direction.

According to this invention, spaces having specific dimensions are formed between the attachment part and the vibrator in an electronic device or the like when the piezoelectric actuator is incorporated into the electronic device. Therefore, the vibrator can be prevented from moving beyond the dimensions of the spaces. This is because the free end is in a completely free and movable state within the space portions, and the vibrator is secured in place by the attachment part to the free end side when subjected to external impact. The stacking direction of the vibrator is designated as the Z direction. Spaces are provided in both the Z direction and the XY in-plane direction that intersects with the Z direction; i.e., in all of the XYZ directions, between the attachment part and the free end. Because of these spaces, the free end is cushioned when subjected to an external force having an arbitrary direction, and the external force is therefore reduced.

It is thereby possible to drive the driven object without hindering vibration, and it is also possible to prevent incidents in which the protuberance of the vibrator becomes separated from the driven object due to impact, the amount by which the driven object is rotated fluctuates, or the vibrator collides with and damages other components. The effect of impact resistance is significant, because the vibrator directly faces the attachment part and the vibrator is securely captured by the attachment part when the vibrator moves or deforms during impact, and also because the vibrator is captured at the free end, where the amount of bending reaches a maximum during impact.

Therefore, resistance against impact from falling or the like can be greatly improved without reducing drive efficiency, and the usual problems with the difficulty of reconciling drive efficiency and impact resistance can be resolved.

Also, the design used to obtain these effects is not difficult, because spaces of specific dimensions need be provided only between the vibrator and the attachment part.

The dimensions of the spaces are appropriately determined according to the amplitude and direction of vibration in the vibrator, the strength of the external force during impact, and other factors.

For example, it is possible to design the conditions of the load on the vibrator during impact, to find the maximum bending amount of the free end of the vibrator, and to set the specific space dimensions to be equal to or less than the maximum dimensions that are determined based on the maximum bending amount and on other factors. Impact resistance under specific load conditions can thereby be ensured.

The tolerances between the vibrator and the attachment part due to nonuniformities in shape and assembling errors may be kept to a minimum.

Furthermore, one significance of forming these spaces between the vibrator and the attachment part while the attachment part is not undergoing external impact is that vibration noise is not likely to occur in the drive electrodes provided to the piezoelectric elements while the piezoelectric actuator is driven, and drawbacks such as the drive control circuit being destroyed by electric shocks can thereby be prevented in advance.

Vibration noise is also not likely to occur in detection electrodes in cases in which detection electrodes for detecting the vibrating state of the piezoelectric elements as voltage signals are provided to parts of the piezoelectric elements. The vibrating state can thereby be accurately and securely detected, and the piezoelectric actuator can be driven in a stable manner on the basis of this vibration detection. Since the vibration can be accurately and securely detected, the detection electrodes can be disposed in the vicinity of the vibration nodes of the vibrator or at other locations having a low vibration detection output, and the layout of electrodes in the piezoelectric elements can be simplified.

In the piezoelectric actuator of the present invention, it is preferable that the free end have a vibrating part that is provided with the fixed part on one side in the longitudinal direction, is formed into a flat substantially rectangular shape, and is made to vibrate in a mixed mode involving both longitudinal vibration that expands and contracts in a longitudinal direction, and bending vibration that bends in a transverse direction that intersects with the longitudinal direction, and that the free end further have an arm part that extends from the other side of the vibrating part in the planar direction of the vibrating part and that is disposed on the attachment part via the spaces; and that the arm part act as a cushion for the piezoelectric actuator.

According to this invention, longitudinal vibration and bending vibration can be securely induced in the vibrating part, and the entire free end can be cushioned by the arm part provided separately from the vibrating part. The drive efficiency and impact resistance of the piezoelectric actuator can be further improved by dividing functions between the vibrating part and the arm part in this manner.

The impact resistance against external stress, particularly stress that acts in a direction aligned with the planar direction of the vibrating part, can be improved, because the arm part faces the attachment part via the spaces in the planar direction of the vibrator. Also, these spaces in the planar direction are no obstruction to longitudinal vibration that is displaced in a direction aligned with the plate surface of the vibrator.

Furthermore, bending vibration is accompanied by a mechanical moment but is not obstructed because a space is also provided in the stacking direction (Z direction) of the vibrator.

It is preferable that the vibrating part (including the protuberances), the fixed part, and the arm part be integrally formed on the reinforcing plate.

In the piezoelectric actuator of the present invention, it is preferable that the characteristic frequency of the arm part be different by a specific value from the characteristic frequency of the longitudinal vibration of the vibrating part; and also be set so as not to interfere with the longitudinal vibration of the vibrating part.

According to this invention, there is no obstacle to inducing bending vibration as secondary vibration because the vibration of the arm part does not interfere with the longitudinal vibration of the vibrating part, and the longitudinal vibration as primary vibration induced by the vibrating part does not diminish.

In the piezoelectric actuator of the present invention, it is preferable that the dimensions of the arm part be set so that the length of the arm part in the longitudinal direction of the vibrator is less than the length of the vibrator in the longitudinal direction; and that the dimensional ratio for the length of the arm part is set so that the ratio of the length of the arm part to the width of the arm part in the transverse direction of the vibrating part is less than the ratio of the length of the vibrating part to the width of the vibrating part in the transverse direction.

According to this invention, the length of the arm part is less than the length of the vibrating part and the dimensional ratio of the arm part is such that the shape of the arm part is not long and thin in comparison with the vibrating part. Therefore, the vibration mode of the arm part is predominantly longitudinal vibration that expands and contracts in the longitudinal direction of the vibrating part, and there is no secondary, tertiary, or other high-order vibration modes in the vibration of the arm part. The vibration mode of the arm part can be considered to be only longitudinal vibration, and characteristic frequency of the arm part is greater than the characteristic frequency of the vibrating part because the dimensions of the arm part are smaller than the vibrating part, and the characteristic frequencies of the arm part and the vibrating part are different. An interference-induced reduction in the vibration of the vibrating part can thereby be satisfactorily prevented. Consequently, there is no reduction in the range of shapes that the arm part can assume so as not to interfere with the vibration of the vibrating part.

In the piezoelectric actuator of the present invention, it is preferable that the surface area obtained by multiplying the length of the arm part in the longitudinal direction of the vibrating part by the width of the arm part in the transverse direction of the vibrating part be less than the surface area of the vibrating part.

According to this invention, the arm part is more lightweight than the vibrating part in cases in which the surface area of the arm part is less than the surface area of the vibrating part and the arm part and in which vibrating part are formed from the same material Therefore, the characteristic frequency of the arm part can be made to be sufficiently different from the characteristic frequency of the vibrating part, and a reduction in the vibration of the vibrating part due to interference from vibration of the arm part can be satisfactorily reduced.

In the piezoelectric actuator of the present invention, it is preferable that a hole be formed in the arm part, that the attachment part have a protrusion that extends towards the hole and that is inserted through the hole, and that the spaces be formed between the protrusion and the inner peripheral edge of the hole in the arm part.

According to this invention, impact resistance can be improved because the inner peripheral edge of the hole in the arm part interlocks with the protrusion of the attachment part during impact, and movement of the vibrating part from the inside of the hole to the outside is securely regulated.

Since the vibrating part is capable of rotating within the hole in the arm part when the vibrator is driven, it is possible to avoid obstruction by the attachment part to bending vibration, which vibrates in a direction that intersects with longitudinal vibration and which is induced by an imbalance in the arrangement of the electrodes or in the positions of the protuberances in relation to the centroid of the vibrator.

In the piezoelectric actuator of the present invention, it is preferable that the protrusion have a stepped part in the middle of the direction of protrusion; and that the spaces be formed between the mutually opposing surfaces of the stepped part and the arm part.

According to this invention, inserting the protrusion into the hole in the arm part allows spaces to be formed not only in the XY direction between the protrusion and the inner peripheral edge of the hole in the arm part, but also in the Z direction between the mutually opposing surfaces of the arm part and the stepped part of the protrusion. The structures created by these spaces function as cushions for the vibrator during impact. Thus, owing solely to the configuration of the arm part, it is possible to provide both impact resistance against external forces acting in the planar direction (XY direction) of the vibrator, and impact resistance against external forces acting in the stacking direction (thickness direction, Z direction) of the vibrator.

In the piezoelectric actuator of the present invention, it is preferable that the arm part be provided in the vicinity of a node of the bending vibration in the vibrator.

According to this invention, since the arm part is provided in the vicinity of a node of bending vibration, the effects of the arm part on the vibration characteristics can be greatly reduced.

Since displacement due to vibration is extremely small in the vicinity of the node, vibration is not obstructed if the dimensions of the spaces between the protrusion and the inner peripheral edge of the hole are reduced, and impact resistance can be further improved by reducing the dimensions of the spaces. In this case, it is possible to use the tolerances between the vibrator and the attachment part as specific space dimensions.

Three nodes of bending vibration in the vibrating part are found to pass through the planar center and to lie on the center line in the longitudinal direction of the vibrating part, and the term "the node of bending vibration in the vibrator" to which the arm part is provided refers to any of these three nodes. It is more preferable that the arm part be provided in the vicinity of the planar center of the vibrating part. This is because the bending vibration node that is located in the planar center of the vibrating part and that is one of the three bending vibration nodes is at the same position as the node of longitudinal vibration of the vibrating part.

The term "the vicinity of the node of bending vibration" includes positions where lines that extend in the transverse direction of the vibrating part from the position of the bending vibration node intersect with the external periphery of the vibrating part (the sides of the vibrating part in the longitudinal direction), and it is preferable that the arm part be provided to such a position.

In the piezoelectric actuator of the present invention, it is preferable that the arm part be provided to the vibrating part via a constricted neck part that is on the side of the arm part and that connects to the vibrating part; and that the neck part on the side of the arm part be provided in the vicinity of the node of bending vibration in the vibrating part.

According to this invention, greater freedom is allowed with the shape of the arm part by providing the neck part on the side of the arm part in the vicinity of the node of the vibrating part, and the vibration energy that is dissipated by the vibrating part through the arm part can be reduced by providing the neck part on the side of the arm part, thus allowing drive efficiency to be improved.

In the piezoelectric actuator of the present invention, it is preferable that the fixed part be provided to the vibrating part via a constricted neck part that is on the side of the fixed part and that connects to the vibrating part; and that the neck part on the side of the fixed part be provided in the vicinity of the node of bending vibration in the vibrating part, at a position that faces the neck part on the side of the arm part in the transverse direction of the vibrating part.

Specifically, in cases in which the vibrating part, the fixed part, and the arm part are integrally formed on the reinforcing plate, which is made of a steel plate from a single material, the neck part on the side of the arm part and the neck part on the side of the fixed part are provided to either side of the vibrating part in the longitudinal direction, on both sides of the center line that passes through the planar center of the vibrating part and is aligned with the transverse direction.

According to this invention, the portions where the arm part and fixed part are provided to the vibrating part via neck parts are in point symmetry about the planar center of the vibrating part. Therefore, during external impact from falling or the like, the vibrating part can be securely captured by the cushioning structure of the arm part from the side directly opposite the fixed part that supports and secures the vibrating part. The vibrating part supported in cantilever fashion by the fixed part is thereby vibrated by impact, making it possible to prevent twisting displacement from the fixed part in radial directions from being added to the vibrating behavior of the vibrating part. Specifically, normal vibration is maintained in the vibrating part even during such disturbances, and fluctuations in the driven amount of the piezoelectric actuator can be prevented.

In the piezoelectric actuator of the present invention, it is preferable that the attachment part have an opposing part that faces the free end from a direction aligned with the stacking direction of the vibrator; and that the spaces be formed between the opposing part and the vibrator.

According to this invention, since the opposing part of the attachment part is disposed on the vibrator in the stacking direction of the vibrator, impact resistance can be improved particularly against external forces acting in a direction aligned with the stacking direction (thickness direction) of the vibrator.

In the piezoelectric actuator of the present invention, it is preferable that the attachment part have a base member to which the vibrator is fixedly attached, and also have a plate member disposed on the other side of the vibrator across from the base member; and that the opposing parts be provided at positions where the base member and the plate member face each other.

According to this invention, the opposing parts provided to the base member and the plate member face towards the free end of the vibrator, and these opposing parts make it possible to further improve impact resistance because the free end is prevented from moving towards the base member as well as towards the plate member during impact.

In the piezoelectric actuator of the present invention, it is preferable that the driven object have a contact surface that is in contact with the protuberance and that is formed into a substantially flat shape.

According to this invention, since the vibrator is captured by the attachment part during impact and the protuberance of the vibrator does not separate from the driven object as previously described, there is no need to form an indentation or the like for holding the protuberance. The driven object can thereby be easily manufactured by press punching or another method.

The flat shape of the driven object can be circular, rectangular, or any other arbitrary shape.

The electronic device of the present invention comprises the piezoelectric actuator previously described.

The piezoelectric actuator can be used in the zoom mechanism or auto-focus mechanism of a camera, or other mechanisms.

According to this invention, providing the above-described piezoelectric actuator makes it possible to achieve the same operations and effects as those previously described.

It is preferable that the electronic device of the present invention be a timepiece comprising timekeeping means and a timekeeping information display unit for displaying the information timed by the timekeeping means.

According to this invention, it is possible for the gears constituting the timekeeping means and the timekeeping information display unit to be driven by the above-described piezoelectric actuator. It is thereby possible to eliminate drawbacks such as those wherein the rotating amount of the driven object fluctuates due to impact and the indicated positions of the date, month, and day of the week become misaligned.

Additionally, it is possible to utilize the advantages of the piezoelectric actuator, which are that the actuator is not affected by magnetism, is very responsive and can be driven in extremely small amounts, can be easily made small and thin, and has high torque.

EFFECTS OF THE INVENTION

According to the present invention, the vibrator is securely cushioned during impact without obstructing the vibration of the vibrator merely by designing spaces having specific dimensions between the vibrator and the attachment part, and it is therefore possible to greatly improve impact resistance without complicating the design or causing a reduction in drive efficiency.

KEY

1: wristwatch (timepiece), 14: main plate (base member), 31: piezoelectric actuator, 32: rotor (driven object), 50: vibrator, 51: reinforcing plate (reinforcing member), 52, 53: piezoelectric elements, 54: pressing plate (plate member), 142: screw pin (attachment part), 144: protrusion, 144A: large part (stepped part), 144B: small part (stepped part), 144C: opposing surface, 322: contact surface, 511: vibrating part, 511A: protuberance, 512: fixed part, 512A: neck part (neck part on the side of the fixed part), 513: arm part, 513A: neck part (neck part on the side of the arm part), 513B: hole, 513C: opposing surface, 541: stepped-down part (opposing part), 74: main plate (base member), 741: pin part (opposing part), 75: pressing plate (plate member), 751: convexity (opposing part), FR: free end, SP1, SP2, SP3, SP4: spaces, A: node position, L1: length (length of vibrating part), L3: length (length of arm part), W1: width of vibrating part), W3: width (width of arm part)

DESCRIPTION OF THE PREFERRED EMBODIMENTS

The first embodiment of the present invention will now be described with reference to the diagrams. In the present embodiment, an example is described in which the present invention is applied to a wristwatch.

First Embodiment

Figure 1:
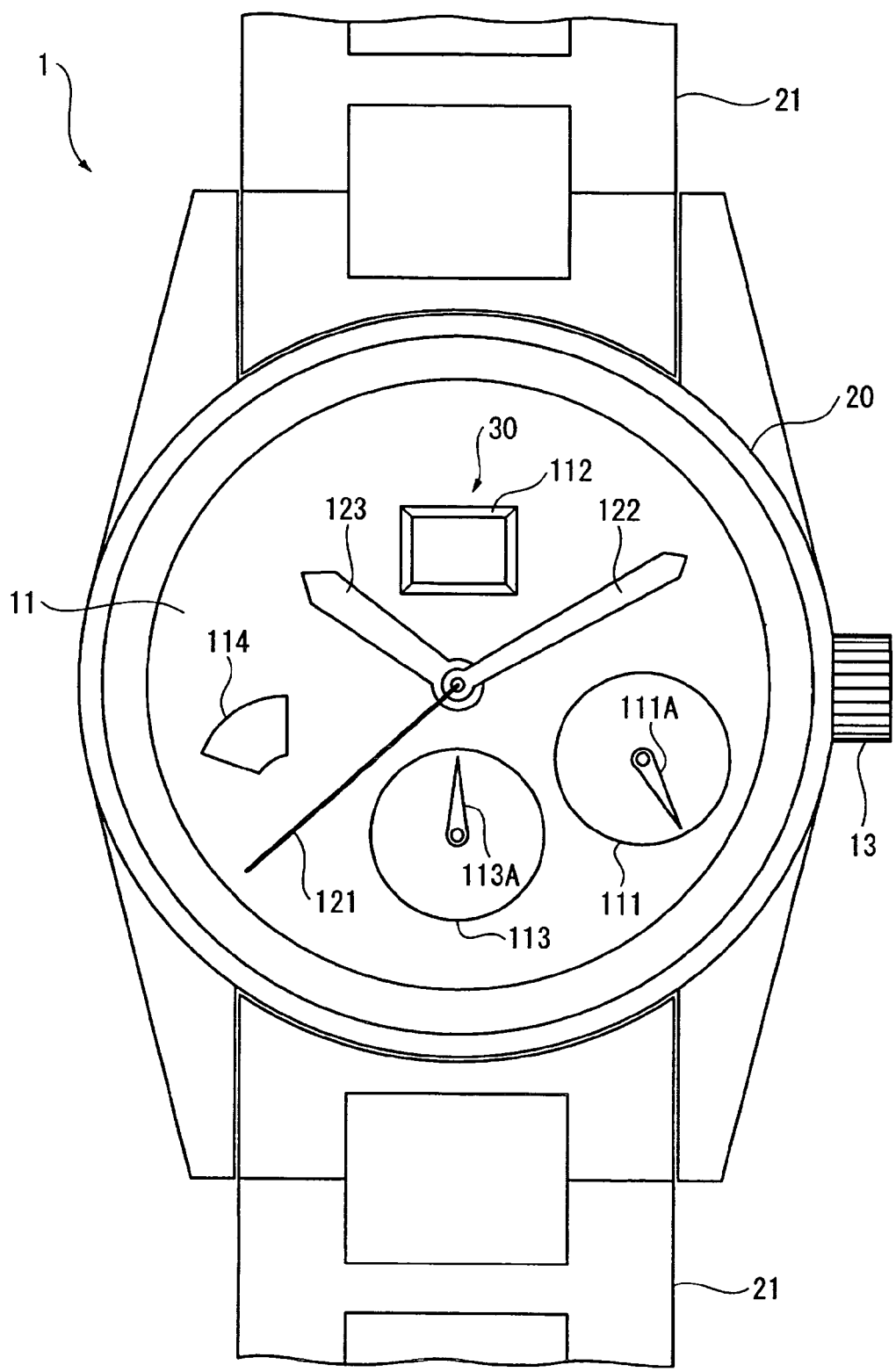
FIG. 1 is an external perspective view of a timepiece in the first embodiment of the present invention.

FIG. 1 is a diagram showing the external configuration of a wristwatch 1 according to the first embodiment of the present invention.

The wristwatch 1 (watch) comprises a movement 10 (FIG. 2) and a case 20 for housing the movement 10, and has a wristband 21 provided to the 12:00 position and the 6:00 position of the wristwatch 1. The timepiece may be a quartz timepiece, a mechanical timepiece, or an electronically controlled mechanical timepiece, but the wristwatch 1 of the present embodiment is configured as an analog quartz timepiece.

The wristwatch 1 has a disc-shaped dial 11, a seconds hand 121, a minute hand 122, an hour hand 123, and a crown 13.

Also, a circular 24-hour display unit 111 is provided to the dial 11, and the hours "0"through "23" are indicated by the rotation of a 24-hour display hand 111A in this 24-hour display unit 111.

Furthermore, the wristwatch 1 comprises a calendar mechanism 30 for displaying the date, and this calendar mechanism 30 includes a rectangular day display window 112, a circular month display unit 113, and a fan-patterned year display window 114, all of which are provided in the dial 11.

The numerals "1" through "31" for indicating the "day" of the date are displayed in the day display window 112. The digits for the ones column and the digits for the tens column in the "day" are shown on separate date wheels, as will be described later.

Displays of "JAN" through "DEC" for indicating the "month" of the date are disposed at equal intervals around the circumference of the month display unit 113, and these displays are indicated by a month display hand 113A to display the "month" of the date.

The digits "0" through "4" for indicating how many years the date is from leap year are displayed in the year display window 114.

Figure 2:
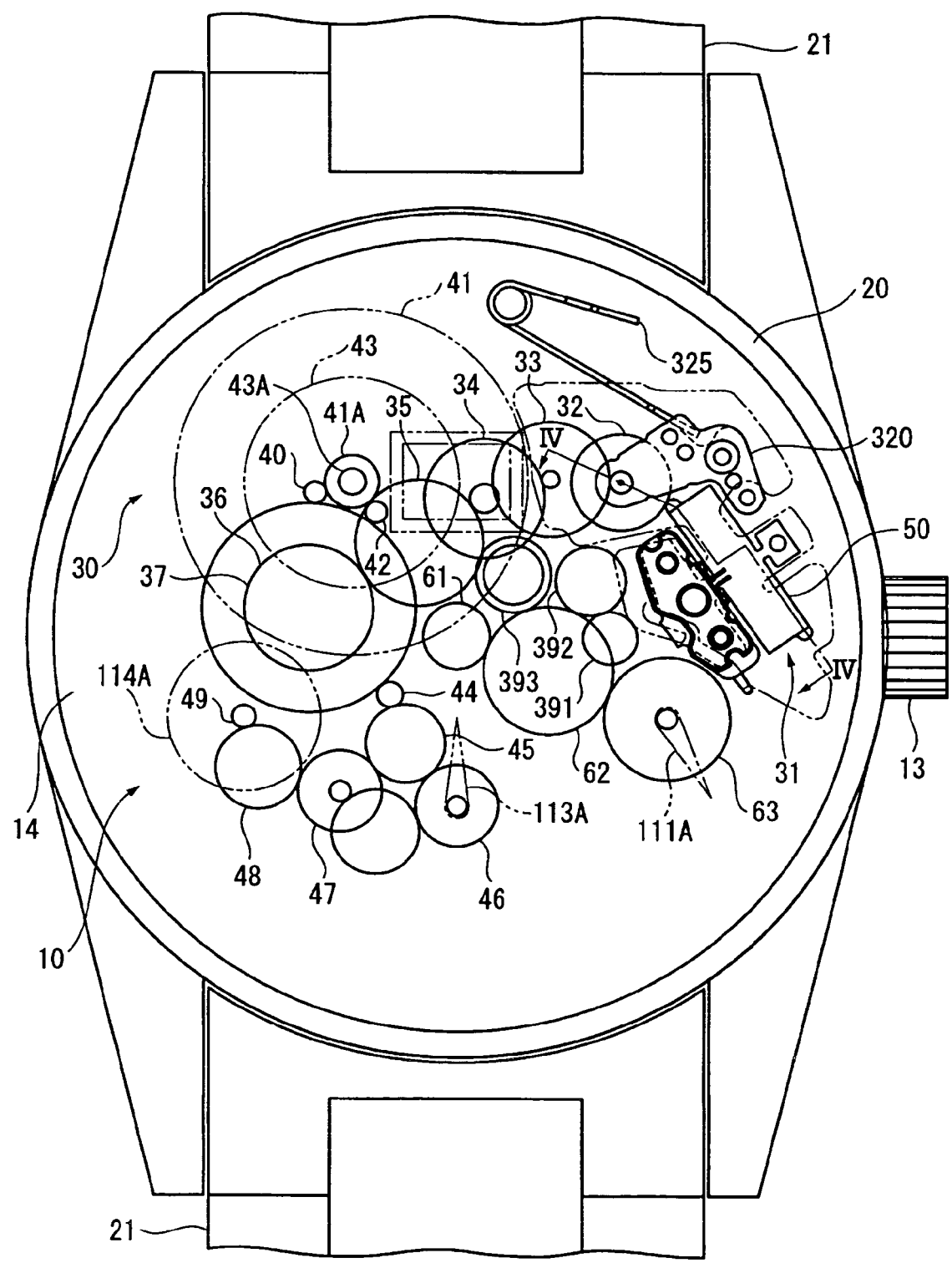
FIG. 2 is a plan view of the movement in the present embodiment.

FIG. 2 is a diagram depicting the movement 10.

A flat, substantially circular main plate 14 is disposed in the movement 10. The main plate 14 of the present embodiment is made from a resin, but may also be made from a metal or the like.

The mechanism for driving the seconds hand 121, the minute hand 122, and the hour hand 123 (FIG. 1) is provided to the main plate 14 on the reverse side of the wristwatch 1 and is similar to that of a normal analog quartz watch, and therefore is not shown in the diagrams. The mechanism comprises a circuit board into which a crystal oscillator is incorporated; a stepping motor having a coil, a stator, and a rotor; a drive gear train; and a battery as a power source. In this configuration, the stepping motor is driven by a pulse signal that is generated by the crystal oscillator and that is divided in frequency by means of a circuit block. The drive force of the stepping motor is transmitted to the drive gear train, whereby the seconds hand 121, the minute hand 122, and the hour hand 123 are each driven. The number of stepping motors is not important, and one possibility, for example, is to provide one stepping motor for driving the seconds hand 121 and one for driving the minute hand 122 and hour hand 123, for a total of two stepping motors.

The calendar mechanism 30 is disposed on the main plate 14 on the front side of the wristwatch 1, as shown in FIG. 2.

The drive means for the calendar mechanism 30 is a piezoelectric actuator 31 that uses the vibration resulting from the inverse piezoelectric effects of the piezoelectric element. The piezoelectric actuator 31 comprises a vibrator 50 that has a piezoelectric element, and the vibration of this vibrator 50 repeatedly applies pressure to the outer periphery of a rotor 32 as the driven object, causing the rotor 32 to be rotatably driven. An intermediate wheel 33 meshes with the rotor 32, and intermediate wheels 33 through 35 are meshed in sequence. The intermediate wheel 35 is meshed with a control wheel pinion 36, and this control wheel pinion 36 is integrally formed on a control wheel 37 that controls the turning of the date. These components constitute a reduction gear train for turning the control wheel 37.

The control wheel 37 comprises ratchet wheels (not shown) that have differing numbers of ratchets, and these ratchet wheels are each meshed with a ones-column day indicator driving wheel 40, a tens-column day indicator driving wheel 42, and a month indicator intermediate wheel 44.

The digits "0" through "9" are displayed at equal intervals in the circumferential direction on the outer peripheral surface of a ones-column day wheel 41 that is turned by the ones-column day indicator driving wheel 40. A "blank space" and the digits "1" through "3" are displayed at equal intervals in the circumferential direction on the outer peripheral surface of a tens-column day wheel 43 that is turned by the tens-column day indicator driving wheel 42. The "blank space" is a space on which no digits are written.

A ones-column ratchet from among the ratchets of the control wheel 37 causes the ones-column day indicator driving wheel 40 and a ones-column day pinion 41A to rotate, thus rotating the ones-column day wheel 41 integrally, and causing the digits "0" through "9"on the outer peripheral surface to be turned in the circumferential direction at rate of once per day. The ones-column day wheel 41 rotates in accordance with the rotation of the control wheel 37. When this rotation reaches the date where the tens column is advanced, the tens-column turning ratchet of the control wheel 37 causes the tens-column day indicator driving wheel 42 and a tens-column day pinion 43A to rotate, thus rotating the tens-column day wheel 43 integrally, and causing a "blank space" or the digits "1" through "3" on the outer peripheral surface to be turned in the circumferential direction at a rate of once every ten days.

The digits "1" through "31" indicating the "day" of the date are displayed through the day display window 112 (FIG. 1) as a result of the combination of the digits "0" through "9" on the ones-column day wheel 41 and the "blank space" or the digits "1" through "3" on the tens-column day wheel 43.

The rotation of the control wheel 37 causes the ones-column day wheel 41 and the tens-column day wheel 43 to rotate. When this rotation reaches the date at which the display of the "month" is advanced, the month turning ratchet of the control wheel 37 causes the month indicator intermediate wheel 44 and a month determination wheel 45 to rotate, and a month wheel 46 rotates integrally with these two wheels. The month display hand 113A attached to the month wheel 46 then rotates and indicates the displays "JAN" through "DEC" on the month display unit 113 (FIG. 1).

A year display intermediate wheel 47 is meshed with the month determination wheel 45, and a year turning wheel 48 is meshed with the year display intermediate wheel 47. A year wheel 49 for turning a year display wheel 114A is meshed with the year turning wheel 48. The year display wheel 114A is turned once per year by the year wheel 49, and the digits "0" through "4" are displayed in sequence through the year display window 114 (FIG. 1). The number of years of the current date from leap year is thereby displayed.

The calendar mechanism 30 is provided with a date correction gear train (the gears 391, 392, and 393 in FIG. 2), and when the crown 13 is pulled out towards the outside of the case 20, the crown 13 meshes with the intermediate wheel 35 via this date correction gear train, and the date can be corrected by rotating the crown 13.

Meanwhile, the structure for driving the 24-hour display hand 111A provided to the 24-hour display unit 111 (FIG. 1) has a 24-hour determination wheel 62 that meshes with an hour wheel 61 to which the hour hand 123 is attached, and that determines the location of the 24 hour mark (12:00 am) from the amount by which the hour wheel 61 has rotated; and also has a 24-hour wheel 63 that meshes with the 24-hour determination wheel 62 and that is attached to the 24-hour display hand 111A.

The 24-hour determination wheel 62 has an encoder for determining when the hand is at the "24 hour" mark from the amount by which the hour wheel 61 has rotated, and also has a spring switch that turns on according to the timing with which the "24 hour" mark is determined by the encoder.

The 24-hour determination wheel 62 is provided with a spring switch connected to a control block that is mounted on a circuit board 15 (FIG. 5) provided to the main plate 14, and the calendar mechanism 30 is driven when this spring switch is turned on. At this time, a one-day turning process is first conducted to rotatably drive the calendar mechanism 30 by an amount equivalent to one day. A calendar determination process is conducted to determine the turned day and to determine whether the day coincides with the current day. If the day does not coincide with the current day, then a calendar correction process is conducted to perform a so-called month-end correction by driving the calendar mechanism 30 in order to display the actual current day.

The most characteristic piezoelectric actuator 31 of the present invention, as well as the peripheral structure, will now be described in detail.

Figure 3:
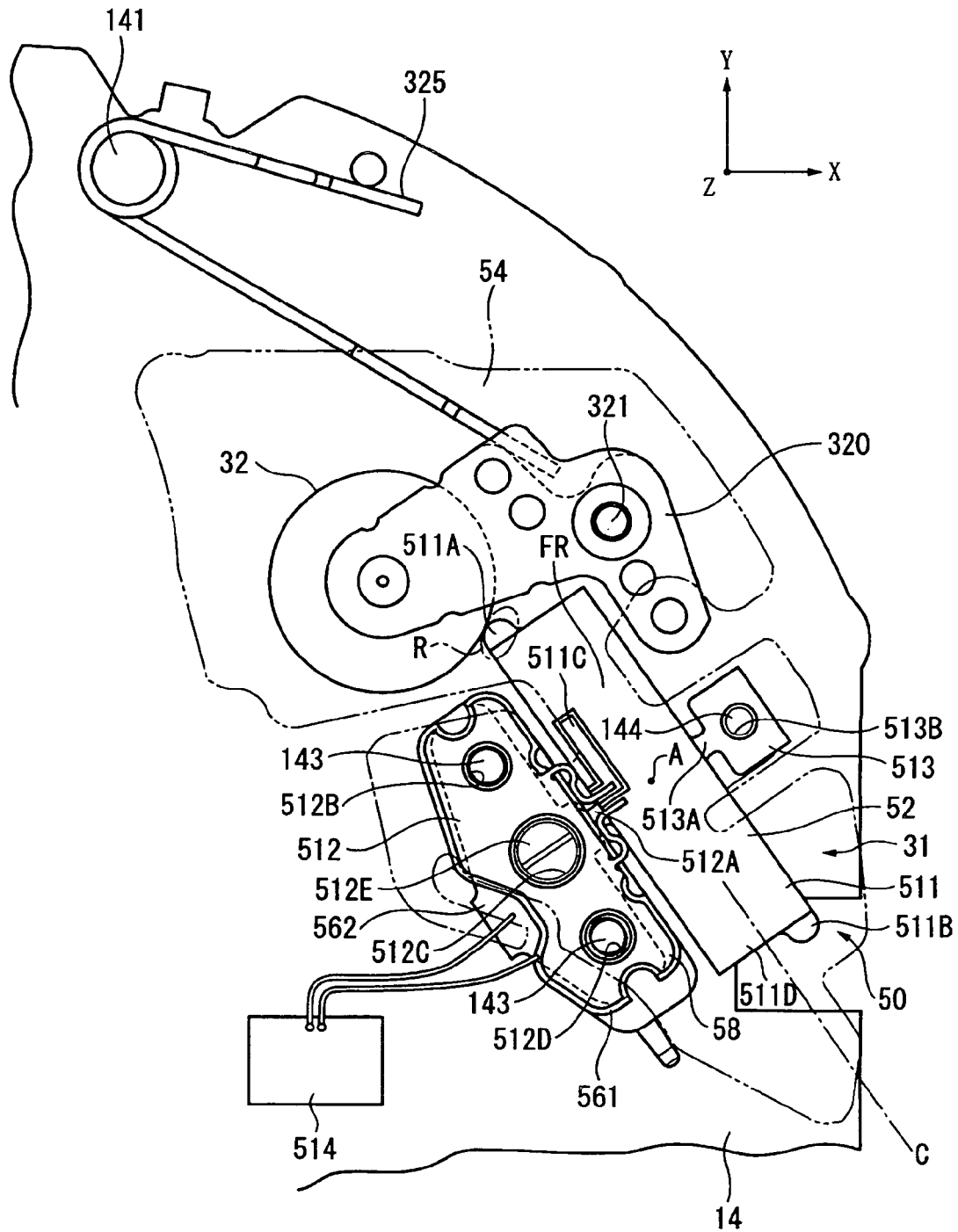
FIG. 3 is an enlarged partial view of FIG. 2, depicting a piezoelectric actuator.
Figure 4:
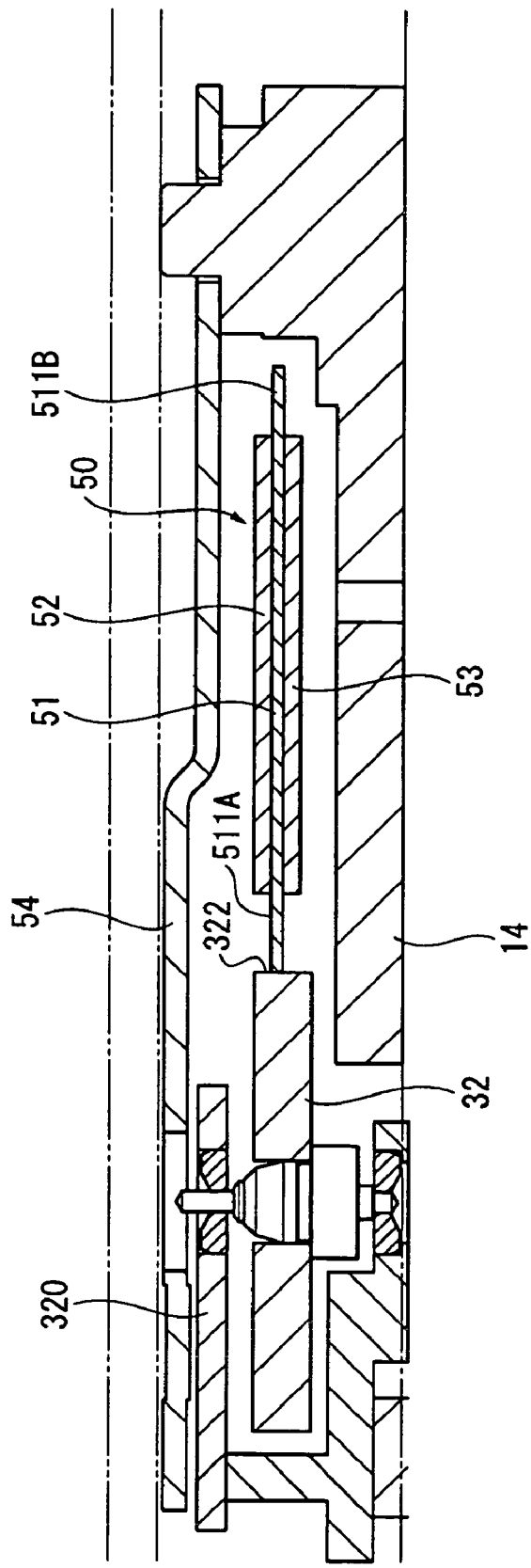
FIG. 4 is a cross-sectional side view of the piezoelectric actuator in the present embodiment.
Figure 5:
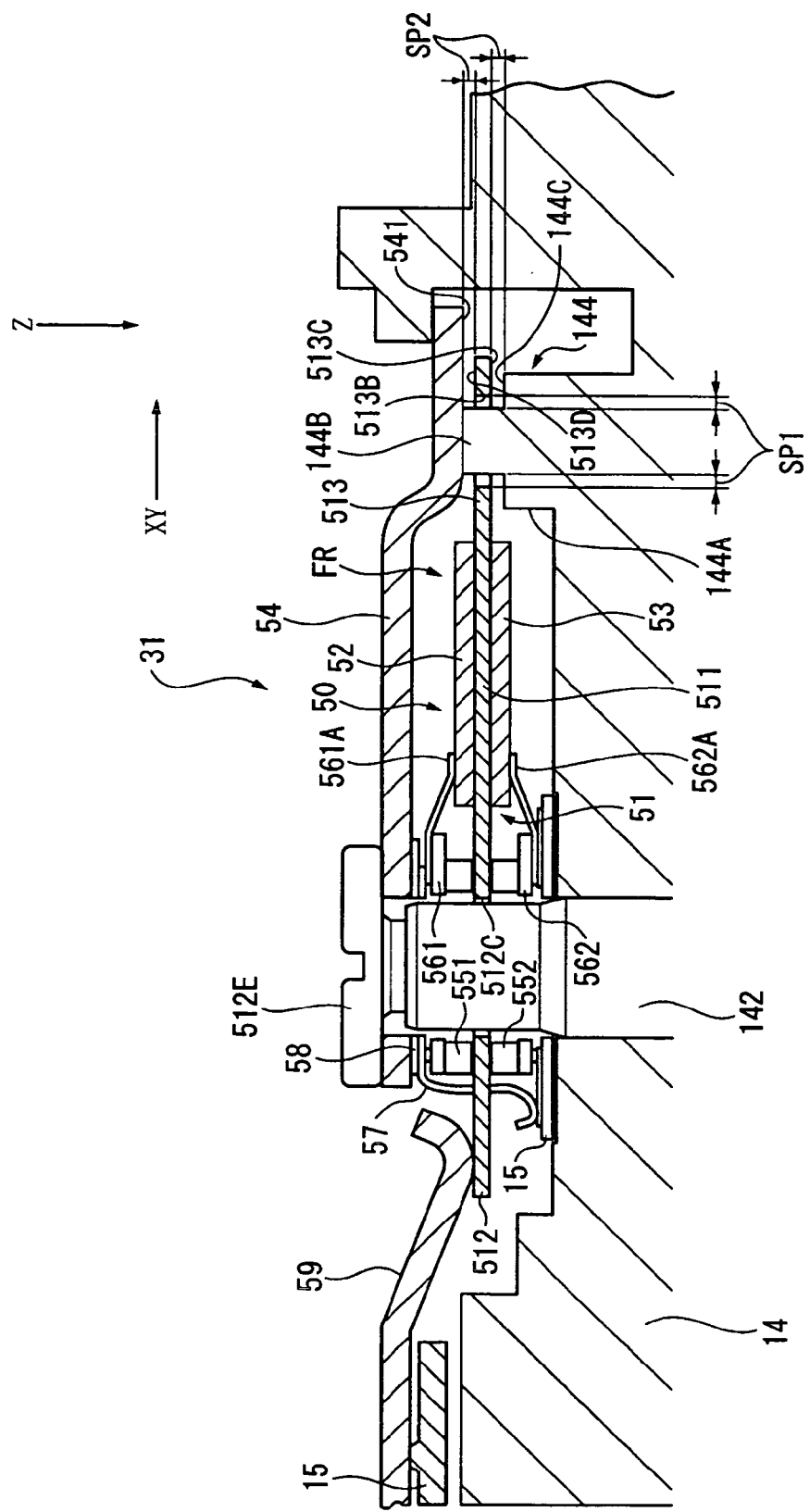
FIG. 5 is a cross-sectional side view of the piezoelectric actuator in the present embodiment.

FIG. 3 is a diagram depicting the piezoelectric actuator 31 together with the peripheral structure, and FIG. 4 is a cross-sectional view as seen from the direction of arrows IV-IV in FIG. 2. FIG. 5 is a cross-sectional view of the piezoelectric actuator 31.

The rotor 32 driven by the piezoelectric actuator 31 is rotatably supported by a rotor supporting member 320.

The rotor supporting member 320 is disposed so as to be able to oscillate about a pin 321, and a pressure spring 325 wound around a shaft 141 provided in the main plate 14 urges the rotor supporting member 320 in the counterclockwise direction in FIG. 3; that is, towards the piezoelectric actuator 31, whereby the rotor 32 comes into contact with the vibrator 50. The contact pressure between the rotor 32 and the vibrator 50 is thereby kept at a suitable pressure that allows the rotor 32 to rotate efficiently when the piezoelectric actuator 31 is driven, and the amount by which the rotor 32 is turned by the vibrator 50 per unit time is kept at a sufficient level.

The rotor 32 is made by press punching or another means, and the contact surface 322 of the rotor 32 against which the vibrator 50 comes into contact is formed into a flat shape devoid of unevenness, as shown in FIG. 4.

The vibrator 50 of the piezoelectric actuator 31 comprises a reinforcing plate (reinforcing member) 51 formed by rolling stainless steel or another metal material, and also comprises rectangular plate-shaped piezoelectric elements 52, 53 laid over either surface of the reinforcing plate.

A pressing plate 54 (illustrated by the double-dashed lines in FIG. 3) as a plate member is disposed so as to cover the vibrator 50.

A spring pin 142 as an auxiliary attaching part is formed on the main plate 14 so as to intersect with the planar direction (the XY direction in FIG. 3) of the reinforcing plate 51 as shown in FIG. 5, and the vibrator 50 is fixedly attached to the spring pin 142.

A pair of positioning pins 143 (FIG. 3) for positioning the vibrator 50 are provided at the sides of the spring pin 142, and a substantially cylindrical protrusion 144 is similarly formed at a position that encloses the vibrator 50 with the positioning pins 143, so as to protrude in the planar direction of the reinforcing plate 51.

The protrusion 144 is provided in the vicinity of a position that divides the lengthwise dimensions of the piezoelectric elements 52, 53 in two.

The protrusion 144 also has a large part 144A (on the side of the main plate 14) and a small part 144B that are disposed concentrically to each other, and a stepped part is formed by the large part 144A and the small part 144B.

The degree to which the protrusion 144 extends is less than that of the spring pin 142. The pressing plate 54 is formed so as to drop towards the main plate 14 at the portion near the protrusion 144, and is mounted at the distal end of the protrusion 144.

The material of the piezoelectric elements 52, 53 is not particularly limited, and can be lead zirconate titanate (registered trademark), crystal, lithium niobate, barium titanate, lead metaniobate, polyvinylidene fluoride, zinc lead niobate, scandium lead niobate, or another material, for example.

Also, electrodes are formed over both entire front and reverse sides of the piezoelectric elements 52, 53 by plating, sputtering, vapor deposition, or another method using nickel or gold. The entire electrodes (not shown) formed on the front and reverse sides of the piezoelectric elements 52, 53 are superposed over the reinforcing plate 51 and are made electrically conductive with the reinforcing plate 51. The electrodes on the front sides of the piezoelectric elements 52, 53 are divided by grooves 511E (FIG. 6) formed by etching, and detection electrodes 511C for detecting the vibrations of the piezoelectric elements 52, 53 as voltage signals by means of the piezoelectric effects are formed, as are drive electrodes 511D to which a drive voltage is applied.

Figure 6:
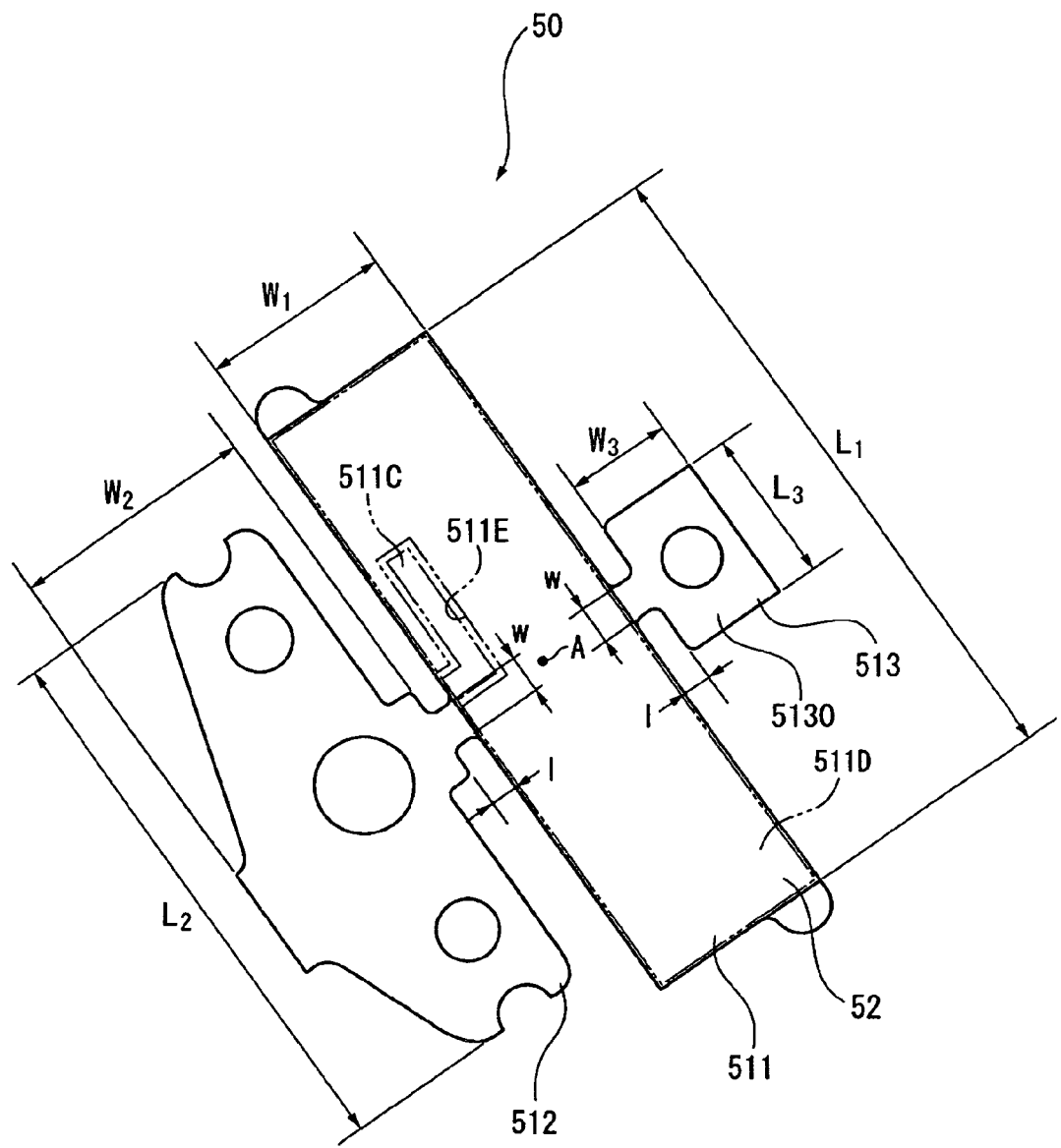
FIG. 6 is a diagram showing the dimensions of components in the piezoelectric actuator shown in FIG. 3.

FIG. 6 depicts a detection electrode 511C and a drive electrode 511D with double-dashed lines. The areas of the electrodes formed on the surfaces of the piezoelectric elements 52, 53 excluding the detection electrodes 511C constitute the drive electrodes 511D. The arrangements of the detection electrodes 511C and the drive electrodes 511D are identical in both the piezoelectric elements 52, 53 that enclose the reinforcing plate 51, wherein the detection electrode 511C of the piezoelectric element 53 is formed on the reverse side of the detection electrode 511C of the piezoelectric element 52, for example. In FIG. 6, the double-dashed lines are drawn as being inside of the outer peripheral edges of the piezoelectric element 52, but the detection electrodes 511C and the drive electrodes 511D are formed to extend to the outer peripheral edges of the piezoelectric elements 52, 53, as shown in FIG. 3.

The detection electrodes 511C extend from the vicinity of the planar centers (refer to position A) of the piezoelectric elements 52, 53 in the longitudinal direction of the piezoelectric elements 52, 53 up to a length equivalent to about $1/5$ to $1/3$ of the long sides of the piezoelectric elements 52, 53 toward one of the widthwise ends of the piezoelectric elements 52, 53 (toward one of the long sides). The widths of the detection electrodes 511C are equivalent to about $1/6$ to $1/3$ of the piezoelectric elements 52, 53. Thus, the surface areas of the detection electrode 511C are considerably smaller than those of the drive electrodes 511D. Position A is a node position of bending vibration in the vibrator 50 as will be later described. Generally speaking, the detection electrodes 511C are disposed in the vicinity of the node position A of the bending vibration in the vibrator 50.

FIG. 3 is a schematic depiction of a drive control circuit 514 (IC chip) that supplies drive voltage to the piezoelectric elements 52, 53. The drive control circuit 514 is installed on the circuit board 15 (FIG. 5), and conduction is established with the reinforcing plate 51 and a lead substrate 561. A drive voltage is applied between the reinforcing plate 51 and the drive electrodes 511D by means of the reinforcing plate 51 and lead substrate 561, and a vibration signal is detected as a differential signal of the detection electrodes 511C in relation to the electric potential of the reinforcing plate 51.

The specific electrical relationship to the piezoelectric actuator 31 will be described later with reference to FIG. 5.

Next, the reinforcing plate 51 has an integrally formed fixed part 512 that is fixedly attached to the spring pin 142, and a free end FR on which the piezoelectric elements 52, 53 are disposed, as shown in FIG. 3.

The free end FR is formed into a flat, substantially rectangular shape corresponding to the shapes of the piezoelectric elements 52, 53, and has a vibrating part 511 to which the fixed part 512 is provided on one side in the longitudinal direction, and an arm part 513 that extends from the other side of the vibrating part 511.

The vibrating part 511 has, on both surfaces along the short sides, protuberances 511A, 511B that protrude in arcuate shapes in the longitudinal direction. These protuberances 511A, 511B both have arcuate shapes with a radius of 0.25 mm and are disposed at positions that are in point symmetry in relation to the node position A (planar center) of bending vibration of the vibrating part 511, and one protuberance 511A is in contact with the rotor 32.

The positions where the protuberances 511A, 511B are formed are disposed at a distance from the center line C aligned with the longitudinal direction of the vibrating part 511, and are formed at positions that are unbalanced with respect to the longitudinal primary vibration in the longitudinal direction of the vibrating part 511. When longitudinal primary vibration is induced by the application of voltage to the piezoelectric elements 52, 53, secondary bending vibration is induced in a direction that intersects the longitudinal direction of the vibrating part 511.

The fixed part 512 is provided in the vicinity of the node position A of the bending vibration induced in a direction that intersects with the longitudinal direction of the vibrating part 511. The fixed part has a neck part 512A that connects with the vibrating part 511 on the side of the fixed part.

The fixed part 512 has holes 512B, 512C, 512D provided in alignment in the longitudinal direction of the vibrating part 511, as shown in FIG. 3. Positioning pins 143 are inserted through the holes 512B, 512D at the ends, and a screw pin 142 (FIG. 5) is inserted through the center hole 512.

The fixed part 512 is provided with spacers 551, 552, and lead substrates 561, 562. These as elements that ensure electrical conduction with the piezoelectric elements 52, 53, as shown in FIG. 5.

The spacers 551, 552 are formed so that their planar shapes are substantially identical to that of the fixed part 512, and are bonded at both sides around the hole 512C of the fixed part 512. The lead substrates 561, 562 are bonded to the spacers 551, 552, respectively.

Copper foils (wiring patterns) 561A, 562A that overhang from the lead substrates 561, 562 are soldered to the piezoelectric elements 52, 53, respectively.

The lead substrates 561, 562 are disposed so that the copper foils 561A, 562A face to the outer side (the side opposite the reinforcing plate 51).

When the fixed part 512 is fixed to the main plate 14, a spring member 57 is assembled and disposed on the lead substrate 561, and the spring member 57 is in electroconductive contact with the circuit board 15. This spring member 57 provides the same electric potential to the electrodes on the outer sides of the piezoelectric elements 52, 53 so as to enclose the reinforcing plate 51.

Furthermore, an insulating plate 58 is disposed on the spring member 57, and the screw pin 142 is inserted through holes formed in the spacers 551, 552, the lead substrates 561, 562, and the insulating plate 58. The vibrator 50 is fixedly attached to the main plate 14 by threading a screw 512E into a female screw hole formed in the screw pin 142 via the pressing plate 54.

The restricted state of the reinforcing plate 51 in the present embodiment is such that the rotation of the reinforcing plate 51 is regulated by inserting the positioning pins 143 and the screw pin 142 through the holes 512B through 512D (FIG. 3), and the reinforcing plate 51 is prevented from chattering in a direction that intersects its plane by fastening a screw 512E.

The pressing plate 54 has a spring part 59 that is electroconductive contact with the reference potential of the circuit board 15, and also with the reinforcing plate 51. The pressing plate 54 is made conductive with the inner sides of the piezoelectric elements 52, 53 via the spring part 59 and the reinforcing plate 51. The pressing plate 54 and the spring member 57 are kept at different electric potentials by the insulating plate 58.

As a result of the vibrator 50 being fixedly attached to the main plate 14 by the fixed part 512, the vibrator is secured in cantilever fashion. With the vibrator 50 as a cantilevered beam, the vibrating part 511 and the arm part 513 that are not secured to the main plate 14 constitute a free end FR of the vibrator 50.

The arm part 513 is formed into a substantially rectangular shape that extends towards the protrusion 144 from a neck part 513A, which is disposed on the side of the arm part and is connected to the vibrating part 511, as shown in FIG. 3. This arm part 513 is provided in the vicinity of the node position A of bending vibration in the vibrating part 511, similar to the fixed part 512, and the neck parts 513A, 512A of the arm part 513 and fixed part 512 are provided at opposing positions in the transverse direction of the vibrating part 511.

A hole 513B through which the small part 144B of the protrusion 144 is inserted is also formed in the arm part 513.

Referring to FIG. 6, specific numerical values are given for the dimensions of the above-described neck parts 513A, 512A of the arm part 513 and the fixed part 512. In a case in which the width W1 (short sides) of the vibrating part 511 in the transverse direction is 1.98 mm and the length L1 (long sides) in the longitudinal direction is 7 mm, the widths w of the neck parts 513A, 512A in the longitudinal direction of the vibrating part 511 are preferably set to about 0.4 to 0.6 mm. It is preferable that the widths w be set to about 5 to 8% of the length L1 of the vibrating part 511, or, even more preferable, to about 6 to 7%. If these widths are less than 5%, then the neck parts will not be strong enough to endure the normal vibration of the vibrating part 511, and if the widths are greater than 8%, then the neck parts will hinder the longitudinal vibration of the vibrating part 511.

Furthermore, the lengths l of the neck parts 513A, 512A in the longitudinal direction of the vibrating part 511 are preferably less than the widths w. It is preferable that the lengths l be about 90%±5% of the widths.

The characteristic frequency of the arm part 513 in the vibration of the vibrating part 511 must be set so as not to interfere with the vibration of the vibrating part 511, but if the arm part 513 is long and thin, then the vibration of the arm part 513 is secondary, tertiary, or another high-order vibration mode, narrowing the range of shapes that the arm part 513 can assume so as not to interfere with the vibration of the arm part 513.

Therefore, the arm part 513 is not designed to be long and thin. Specifically, the shape is designed so that the length of the arm part 513 in the longitudinal direction of the vibrating part 511 is less than that of the vibrating part 511 and the fixed part 512, whose length is less than that of the vibrating part 511. In other words, referring to FIG. 6, the length L3 of the arm part 513 is less than both the length L2 of the fixed part 512 and the length L1 of the vibrating part 511. The width W3 of the arm part 513 is less than the length L3 of the arm part 513, but the ratio of the length L3 to the width W3 is less than both the ratio of the length L1 to the width W1 of the vibrating part 511 and the ratio of the length L2 to the width W2 of the fixed part 512. In other words, the arm part 513 is not longer and thinner than the fixed part 512 or the vibrating part 511.

The vibration mode induced by the arm part 513 is thereby predominantly a vibration in the longitudinal direction of the vibrating part 511. The interference-induced reduction in vibration can be preventing by placing the characteristic frequency of the arm part 513 at a sufficient distance from the characteristic frequency of the vibrating part 511.

These dimensions for the arm part 513 result in the surface area of the arm part 513 being less than the surface areas of both the fixed part 512 and the vibrating part 511, and also in the arm part 513 being lighter in weight than both the fixed part 512 and the vibrating part 511. Therefore, it is possible to place the characteristic frequency of the arm part 513 at a sufficient distance from the characteristic frequency of the vibrating part 511, and a reduction in the vibration of the vibrating part 511 resulting from interference with the vibration of the arm part 513 can be satisfactorily reduced.

With the arm part 513 thus configured, the vibration of the arm part 513 can be considered as a problem that involves mass and a spring constant. The characteristic frequency P of the arm part 513 is expressed by the following mathematical equation (1), wherein W3 is the width of the arm part 513 (FIG. 6), t is the thickness of the arm part 513, L3 is the length of the arm part 513 (FIG. 6), m is the mass of the arm part 513, and E is the Young's modulus of the reinforcing plate 51.

[Eq. 1]

$$P = \sqrt{\frac{W_3^3 tE}{4mL_3^3}} \text{ [rad/sec]} \quad (1)$$

The specific value of the characteristic frequency of the arm part 513 is determined from the relationship of this frequency with the characteristic frequency of the longitudinal vibration of the vibrating part 511, or the frequency of the drive voltage applied to the piezoelectric actuator 31. The frequency of the drive voltage (the drive frequency) is determined with consideration to the resonance point of longitudinal vibration and the resonance point of bending vibration in the vibrating part 511.

FIG. 7A depicts the relationship between the drive frequency and impedance in the vibrating part 511, and FIG. 7B depicts the relationship between the drive frequency and amplitude of longitudinal vibration, and also between the drive frequency and amplitude of bending vibration in the vibrating part 511. As shown in FIG. 7A, two resonance points occur at which the impedance is extremely low in relation to the drive frequency and at which the amplitude reaches a maximum. The lower of these frequencies is the resonance point of longitudinal vibration, while the higher is the resonance point of bending vibration.

Specifically, when a vibrator 20A is driven at a frequency that lies between the longitudinal resonance frequency fr1 of longitudinal vibration and the bending resonance frequency fr2 of bending vibration, the amplitudes of both the longitudinal vibration and bending vibration are maintained, and the piezoelectric actuator 31 is driven with high efficiency. A drive frequency at which the amplitudes of both the longitudinal vibration and bending vibration are even greater can be set by bringing the longitudinal resonance frequency fr1 and the bending resonance frequency fr2 close to each other.

Figure 7:
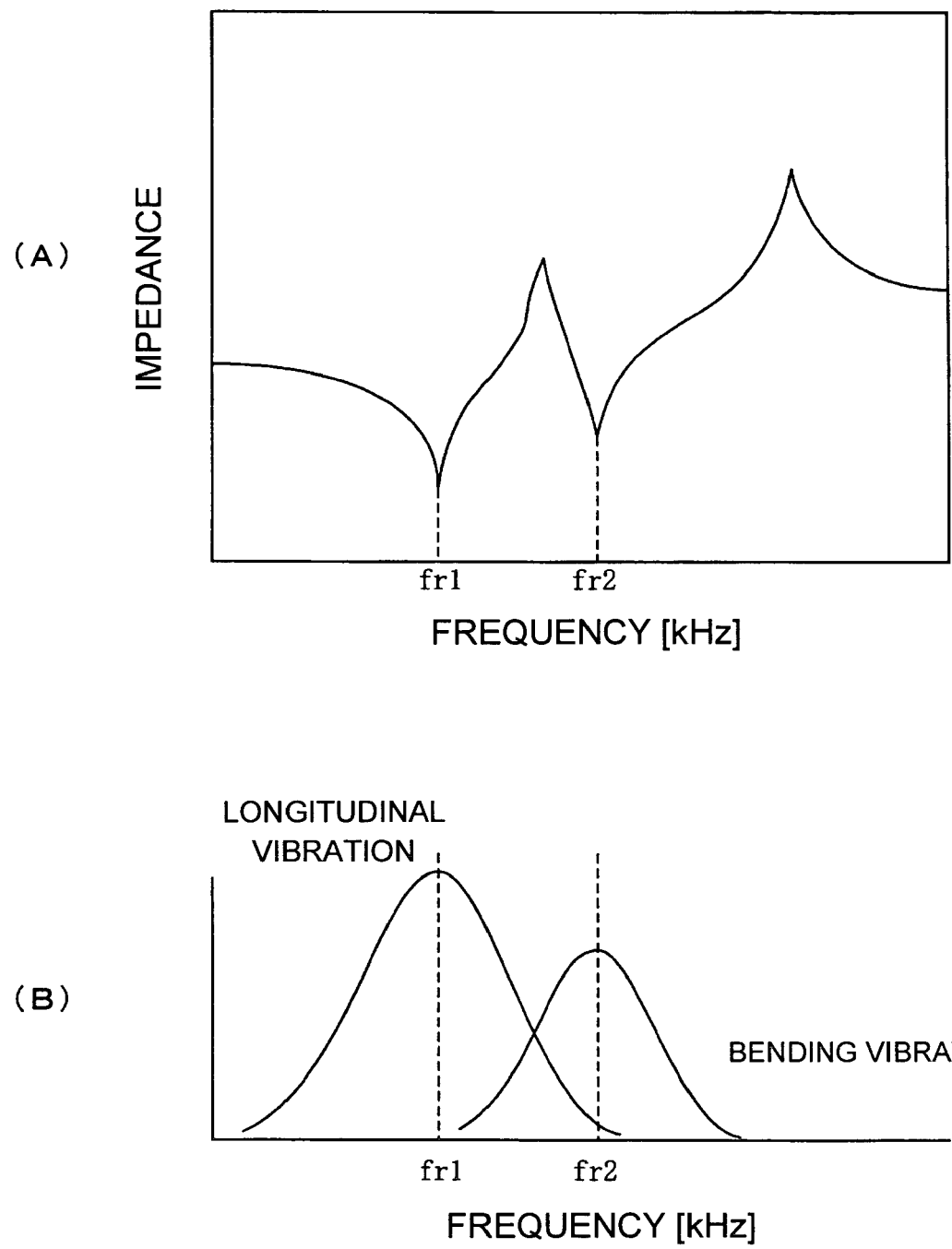
FIG. 7 deals with the vibrator in the present embodiment, wherein 7A is a graph depicting the relationship between drive frequency and impedance, and 7B is a graph depicting the relationship between drive frequency and the amplitude of both longitudinal and bending vibration.

In the present embodiment, the longitudinal resonance frequency (characteristic frequency of the longitudinal vibration) of the vibrating part 511 is about 200 kHz. Referring to FIG. 7, the drive frequency is set in a range of about 230 kHz to about 300 kHz. It is assumed that if the characteristic frequency of the arm part 513 is about 5% of the characteristic frequency of 200 kHz of longitudinal vibration, i.e., 10 kHz or greater as a specific value, then the vibration of the arm part 513 does not interfere with the vibration of the vibrating part 511. This specific value of 10 kHz is about 4% of the drive frequency in cases in which the drive frequency is 250 kHz. In this case, the vibration of the arm part 513 does not interfere with the longitudinal vibration of the vibrating part 511. If the longitudinal vibration as the primary vibration induced by the vibrating part 511 does not diminish, then there is no obstacle to inducing bending vibration as secondary vibration. The characteristic frequency settings of the arm part 513 can be expressed by the following conditional equations (2-1) and (2-2).

[Eq. 2]

$$\frac{1}{2\pi}\sqrt{\frac{W_3^3 tE}{4mL_3^3}} < \left(\begin{array}{c}\text{longitudinal resonance}\\\text{frequency of the vibrating part}\end{array}\right) - 10\text{ kHz} \quad (2\text{-}1)$$

$$\left(\begin{array}{c}\text{longitudinal resonance}\\\text{frequency of the vibrating part}\end{array}\right) + 10\text{ kHz} < \frac{1}{2\pi}\sqrt{\frac{W_3^3 tE}{4mL_3^3}} \quad (2\text{-}2)$$

However, in cases in which the wristwatch 1 is subjected to external impact from being dropped or the like, there is a danger that the vibrator 50 or the rotor 32 will be damaged if the force of this external impact acts in a direction in which pressure is applied to the rotor 32 and the vibrator 50. Also, if the force of external impact acts in this direction when the piezoelectric actuator 31 is being driven, then the amplitude of the piezoelectric actuator 31 is reduced, and it might not be possible for the rotor 32 to be turned sufficiently. Furthermore, the impact may cause the vibrator 50 to collide with and damage other components.

In view of this, to provide the piezoelectric actuator 31 with an impact-resistant structure, spaces SP1, SP2 are formed between the arm part 513 and the protrusion 144 of the main plate 14, as shown in FIG. 5, when the piezoelectric actuator 31 is incorporated into the main plate 14. Specifically, a space SP1 is formed in the planar direction (XY direction) of the reinforcing plate 51 between the inner peripheral edge of the hole 513B in the arm part 513 and the small part 144B of the protrusion 144, and a space SP2 is formed in the thickness direction Z of the wristwatch 1 (substantially the same direction as the direction in which the piezoelectric elements 52, 53 and the reinforcing plate 51 are stacked) between the mutually opposing surfaces 513C, 144C of the arm part 513 and the large part 144A. The space SP2 is also formed in the thickness direction Z of the wristwatch 1 between a stepped-down part 541 of the pressing plate 54 and an opposing surface 513D of the arm part 513 that faces this stepped-down part 541.

These spaces SP1, SP2 are formed in a manner that does not cause external impact, and the presence of these spaces SP1, SP2 allows the free end FR to move, and vibration in the vibrating part 511 to be maintained. During impact, the movement of the vibrating part 511 is kept within the range of the spaces SP1, SP2 and the vibrating part 511 does not move beyond the dimensions of the spaces SP1, SP2.

Therefore, the vibrating part 511 can be prevented from colliding with the rotor 32 and other components.

The dimensions of the spaces SP1, SP2 are set according to the directions and amplitudes of both the longitudinal vibration and bending vibration, and also are set according to the relationship between the maximum amount of bending in the free end FR when the wristwatch 1 undergoes impact, the internal stress that occurs in the neck part 512A due to a uniformly distributed load in the vibrator 50 (shown as a beam) when the free end FR undergoes maximum bending, and the strength of the stainless steel that constitutes the reinforcing plate 51. In other words, if the vibrator 50 is displaced or deformed during impact, the vibrating part 511 does not move outside of the range of the spaces SP1, SP2, and the neck part 512A is prevented from breaking or being otherwise damaged.

The impact resistance can be improved by reducing the dimensions of the spaces SP1, SP2 to an extent that does not inhibit vibration. Therefore, the tolerances between the vibrator 50 and the protrusion 144 that result from assembling errors or nonuniformities in the shapes of the reinforcing plate 51 or the piezoelectric elements 52, 53 can be established as the dimensions of the spaces SP1, SP2.

The conditions of the load applied to the wristwatch 1 during impact vary depending on the orientation and position of the wristwatch 1 when the wristwatch 1 is dropped or bumped, but the force of impact acting on the vibrator 50 when the wristwatch falls and lands on the floor with the 9:00 to 3:00 direction aligned vertically is greater than in a case in which the wristwatch falls to the floor with the 6:00 to 12:00 direction aligned vertically and in which the impact is absorbed by the wristband 21 provided to the 6:00 and 12:00 positions. Therefore, in the present embodiment, the maximum amount of bending in the free end FR is calculated from the external force that acts on the vibrator 50 when the wristwatch 1 is dropped from a height of several meters, and the wristwatch 1 strikes the floor on the side of the case 20 while the 9:00 to 3:00 direction is aligned vertically.

This calculation is not limited to cases in which the side of the case 20 of the wristwatch 1 strikes the floor, and the maximum amount of bending when the front (cover glass side) or back (back lid side) of the case 20 of the wristwatch 1 strikes the floor may also be used.

To achieve maximum bending in the vibrator 50, the load on the vibrator 50 is configured as a point load rather than a linear load in which bending is distributed by the uniform load distribution properties of a beam, and the position at which the load is applied is moved to the vicinity of the arm part 513 of the vibrating part 511.

The piezoelectric actuator 31 in the present embodiment is driven by the application of single-layer alternating-current voltage. When the piezoelectric actuator 31 is driven, a drive voltage with a frequency of 250 kHz, for example, is applied to the piezoelectric elements 52, 53 by a voltage application device (not shown). The piezoelectric elements 52, 53 are thereby simultaneously expanded and contracted using the reinforcing plate 51 as a common electrode, inducing longitudinal primary vibration that expands and contracts in the longitudinal direction. The presence of a transverse moment in the vibrating part 511 caused by an imbalance between the protuberances 511A, 511B causes the vibrating part 511 to undergoes secondary bending vibration in which the vibrating part 511 bends along the transverse direction in point symmetry about the planar center (node position A), and the vibrating part 511 to vibrate in a mixed mode of both longitudinal vibration and bending vibration. The protuberance 511A of the vibrator 50 is thereby caused to move in a substantially elliptical route R (FIG. 3). The movement of the protuberance 511A in the route R allows the rotor 32 to be rotatably driven in the counterclockwise direction in FIG. 2.

The protuberance 511B that is not in contact with the rotor 32 functions as a balancer at a position symmetrical to the protuberance 511A, whereby the path of the protuberance 511A has the desired route R.

When the piezoelectric actuator 31 is driven in this manner, the free end FR of the vibrator 50 can move within the confines of the space SP1 and the space SP2, and these spaces SP1, SP2 are set on the basis of the amplitudes of the longitudinal and bending vibrations. Therefore, the vibration of the vibrating part 511 is not obstructed by the protrusion 144, and the drive efficiency is not reduced even if the protrusion 144 is inserted through the hole 513B in the arm part 513. Specifically, because the space SP1 is formed, there is no obstruction to longitudinal vibration in which displacement occurs in the direction aligned with the plate surface of the vibrating part 511. Also, a mechanical moment accompanies the bending vibration, but the presence of the space SP2 prevents the bending vibration from being obstructed.

When the wristwatch 1 is dropped or otherwise struck, the vibrator 50 begins to move and deform in an arbitrary direction that includes both the planar direction (XY direction) and thickness direction Z of the wristwatch 1 due to the external force of the impact. Depending on the magnitude of the impact force, the vibrating part 511 either moves within the spaces SP1, SP2 or moves through the spaces SP1, SP2, after which the protrusion 144 interlocks with the hole 513B in the arm part 513.

Specifically, the movement of the vibrating part 511 is captured by the space SP1 when external force acts in the planar direction (XY direction) of the wristwatch 1, and the movement of the vibrating part 511 is captured by the space SP2 when external force acts in the thickness direction Z of the wristwatch 1.

Since the neck part 513A of the arm part 513 and the neck part 512A of the fixed part 512 are in point symmetry about the planar center (node position A) of the vibrating part 511, the vibrating part 511 can be securely captured by the cushioning structure of the arm part 513 from the side exactly opposite the fixed part 512 when the wristwatch is dropped or subjected to other external impact. The vibrating part 511 supported in cantilever fashion by the fixed part 512 is thereby vibrated by the impact, preventing twisting displacement from the fixed part 512 in radial directions from being added to the vibrating behavior of the vibrating part 511. Specifically, normal vibration is maintained in the vibrating part 511 even during such disturbances.

Therefore, it is possible to prevent the vibrating part 511 from moving beyond the spaces SP1, SP2 and colliding with and damaging the rotor 32 and other components, to prevent the vibrating part 511 from separating too far from the rotor 32 and causing the rotational amount of the rotor 32 to fluctuate, and to prevent the pressurized engagement with the rotor 32 from becoming completely disengaged.

Also, since the spaces SP1, SP2 are determined while giving consideration to the material strength of the stainless steel in the neck part 512A of the fixed part 512, it is possible to prevent the area in the vicinity of the neck part 512A from breaking due to impact, and to prevent the copper foils 561A, 562A provided to the neck part 512A from tearing.

Specifically, according to the present embodiment, the following effects are achieved.

(1) In the piezoelectric actuator 31 for driving the calendar mechanism 30 of the wristwatch 1, the vibrator 50 has an arm part 513, and spaces SP1, SP2 are formed between the arm part 513 and the protrusion 144 when the vibrator 50 is incorporated into the main plate 14. Therefore, the free end FR moves freely within these spaces SP1, SP2 during driving, but the protrusion 144 is captured by the arm part 513 when the wristwatch is subjected to external impact. Since the vibrating part 511 is secured in place at both sides where the fixed part 512 and the arm part 513 are provided, the vibrating part 511 can thereby be prevented from moving beyond the dimensions of the spaces. The space SP1 is formed in the XY direction and the space SP2 is formed in the Z direction, and the presence of these three-dimensional spaces cushions the arm part 513 when external force that can act in an arbitrary direction is applied, reducing the external force.

Therefore, it is possible for the rotor 32 to be driven without hindering the vibration of the reinforcing plate 511, and it is also possible to prevent impact from causing fluctuations in the rotation of the rotor 32 by the vibrating part 511, and to prevent the vibrating part 511 from colliding with and damaging the rotor 32, the rotor supporting member 320, and other components.

(2) The effect of impact resistance is significant because the arm part 513 faces the protrusion 144 from the other side of the spaces SP1, SP2 and the vibrator 50 is securely captured by the protrusion 144 when the vibrator moves and deforms during impact, and also because the vibrator 50 is captured at the free end FR, where the amount of bending reaches a maximum during impact.

Therefore, resistance against impact from falling or the like can be greatly improved without reducing drive efficiency, and the usual problems with the difficulty of reconciling drive efficiency and impact resistance can be resolved.

The design used to obtain these effects is not difficult to accomplish because spaces SP1, SP2 having specific dimensions need be provided only between the free end FR and the protrusion 144 on the basis of the maximum bending amount of the free end FR, the internal stress in the neck part 512A, the material strength of the reinforcing plate 51, and other factors, as previously described.

(3) Furthermore, impact resistance can be improved because of a structure in which the protrusion 144 is inserted through the hole 513B formed in the arm part 513 of the vibrator 50, and a space SP1 is formed by the gap between the protrusion 144 and the hole 513B in the arm part 513. Another reason for the improved impact resistance is that the inner peripheral edge of the hole 513B in the arm part 513 interlocks with the protrusion 144 during impact, whereby the vibrating part 511 is securely controlled in its ability to move from the inside of the hole 513B to the outside.

(4) Since the protrusion 144 inserted through the hole 513B in the arm part 513 is configured with a large part 144A and a small part 144B, not only is a space SP1 formed between the inner peripheral edge of the hole 513B and the outer periphery of the protrusion 144 (the small part 144B), but a space SP2 is also formed between the opposing surfaces 144C, 513C of the large part 144A and the arm part 513, and the structures of these spaces SP1, SP2 can be made to function as a cushion for the vibrator 50 during impact. A pressing plate 54 is also provided, and the space SP2 formed between the stepped-down part 541 and the opposing surface 513D of the arm part 513 also serves as a cushioning structure for the vibrator 50.

Thus, impact resistance can be improved even further because spaces SP1, SP2 are formed in the planar direction (XY direction) and the thickness direction Z of the wristwatch 1, and the structures of these spaces SP1, SP2 make it possible to confine the movement of the vibrator 50 caused by external forces acting in the planar direction and thickness direction of the wristwatch 1, as well as in inclined directions that intersect with the planar direction or thickness direction.

(5) Since the fixed part 512 and arm part 513 are provided to the vibrating part 511 via the constricted neck parts 512A, 513A, and these neck parts 512A, 513A are provided in the vicinity of the node position A of bending vibration in the vibrating part 511, the effects of the fixed part 512 and arm part 513 on the vibrating characteristics of the vibrating part 511 can be greatly reduced.

Also, the drive efficiency of the piezoelectric actuator 31 can be improved because the vibration energy that is dissipated by the vibrating part 511 through the arm part 513 and the fixed part 512 can be reduced.

(6) As described above, since the vibrator 50 is captured by the protrusion 144 during impact, and the protuberance of the vibrator 50 does not separate from the rotor 32, there is no need to form an indentation or the like for holding the protuberance 511A in the contact surface 322 of the rotor 32, and the contact surface 322 can be formed into a substantially flat shape with no irregularities. The rotor 32 can thereby be easily manufactured by press punching or another method.

(7) Applying the piezoelectric actuator 31 that has superior impact resistance to a wristwatch 1 that has a calendar mechanism 0 does not cause the rotation of the rotor 32 to fluctuate during impact, and eliminates drawbacks such as the calendar display being off-center in the day display window 112 or the month display unit 113, producing a remarkable effect.

(8) Additionally, one significance of the spaces SP1, SP2 is that vibration noise is not likely to occur in the drive electrodes 511D provided to the piezoelectric elements 52, 53 while the piezoelectric actuator 31 is driven, and drawbacks such as the drive control circuit 514 being destroyed by electric shocks can therefore be prevented in advance. Since vibration noise is also not likely to occur in the detection electrodes 511C, the vibrating state of the vibrating part 511 can be accurately and securely detected regardless of whether the detection electrodes 511C are made significantly smaller than the drive electrodes 511D in the vicinity of the node position A so as not to interfere with the vibration of the vibrating part 511. The piezoelectric actuator 31 can be driven in a stable manner by the drive control circuit 514 on the basis of this vibration detection.

Second Embodiment

Next, the second embodiment of the present invention will be described.

In the following descriptions, element that are similar to those of the above-described embodiment are denoted by the same numerical symbols, and descriptions thereof are omitted or simplified.

The present embodiment differs from the first embodiment in that spaces of specific dimensions are formed between the surface of the vibrator 50 and the main plate and pressing plate that are disposed on either side of the vibrator 50.

Figure 8:
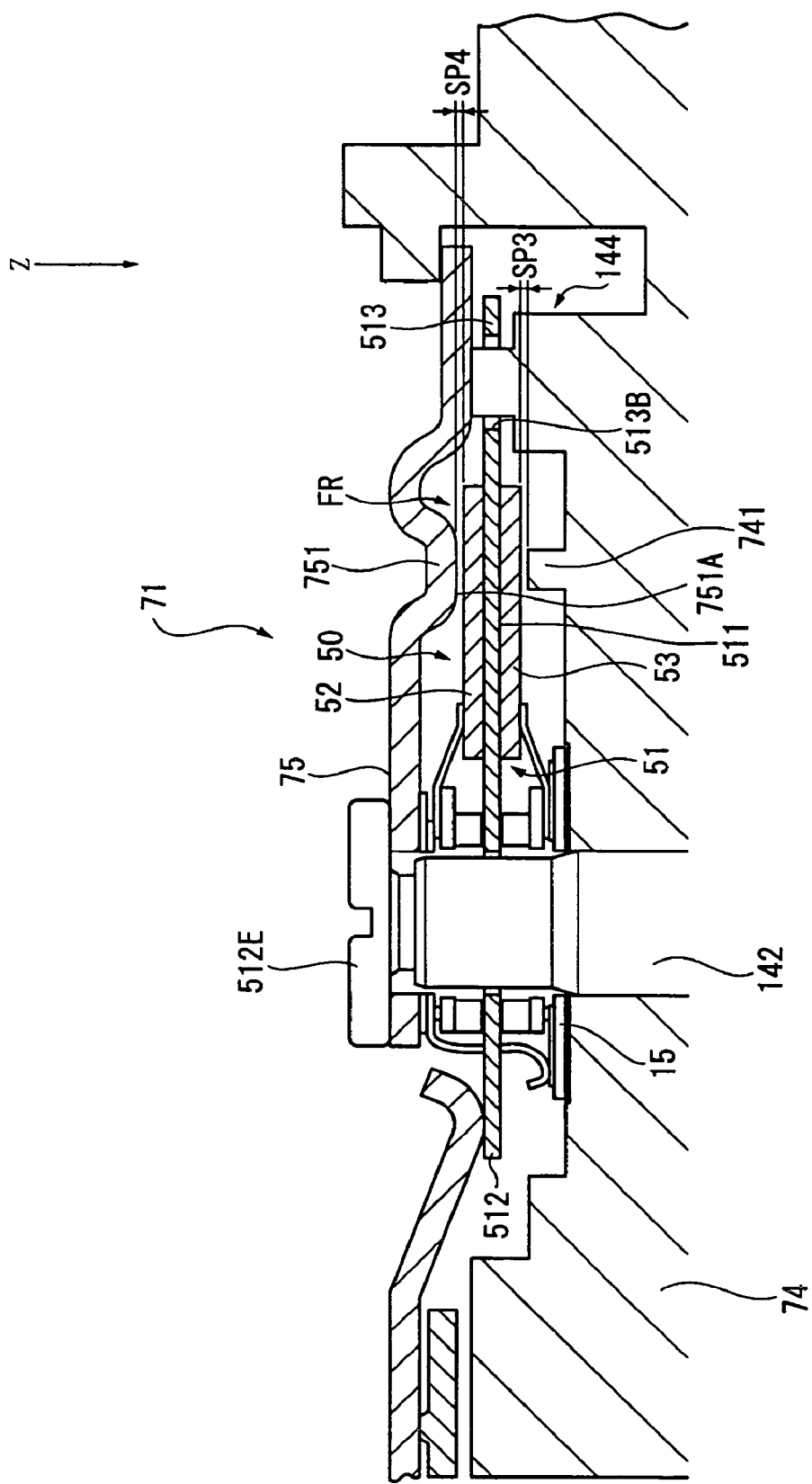
FIG. 8 is a cross-sectional side view of the piezoelectric actuator in the second embodiment of the present invention.

FIG. 8 is a cross-sectional side view of a piezoelectric actuator 71, a main plate 74 as a base member, and a pressing plate 75 in the present embodiment.

A pin part 741 is formed in the main plate 74 as an opposing part that extends in the thickness direction (substantially the same direction as the stacking direction of the reinforcing plate 51 and the piezoelectric elements 52, 53) of the wristwatch 1 towards a free end FR of the vibrator 50.

Also, a convexity 751 is formed by press molding or the like in the pressing plate 75 as an opposing part that extends in a direction aligned with the thickness direction Z of the wristwatch 1, and the protruding distal end surface of the convexity 751 constitutes an opposing surface 751A that faces the vibrator 50.

When the vibrator 50 is incorporated into the main plate 74 and the pressing plate 75, the pin part 741 and the opposing surface 751A face each other from either side of the free end FR, a space SP3 is formed between the pin part 741 and the reverse surface of the vibrating part 511, and a space SP4 is formed between the opposing surface 751A of the pressing plate 75 and the front surface of the vibrating part 511.

According to the present embodiment, the following effects are achieved in addition to the operational effects described in the first embodiment.

(9) Since a pin part 741 and a convexity 751 are formed respectively in the main plate 74 and the pressing plate 75, and the pin part 741 and convexity 751 face the free end FR of the vibrator 50 in the thickness direction Z of the wristwatch 1 via the spaces SP3, SP4, the free end FR is prevented from moving into the main plate 74 as well as into the pressing plate 75 during impact, and impact resistance can be further improved.

(10) Moreover, the impact resistance of the vibrator 50 can be even further improved because the pin part 741 and the convexity 751 are provided so as to face the free end FR where bending reaches a maximum during impact.

[Modifications of the Invention]

The preferred configurations for working the present invention were described in detail above, but the present invention is not limited thereto. Specifically, the present invention is particularly illustrated and described primarily with reference to specific embodiments, but those skilled in the art can make various modifications and improvements to the shapes, materials, quantities, and other specific details of the embodiments described above without deviating from the scope of the technical ideas and objects of the present invention.

The descriptions that are disclosed above and that refer to specific shapes, materials, and other aspects are given solely with the intent of making the present invention easy to understand and are not intended to limit the present invention. For this reason, descriptions that contain names of members in which some or all of the limitations on shapes, materials, and other items have been removed are also included in the present invention.

For example, in the previous embodiments, spaces SP1, SP2 were formed between the protrusion 144 and the inner peripheral edge of the hole 513B in the arm part 513, but the structure is not limited thereto and may also be designed so that a concavity instead of a hole is formed in the arm part and spaces are formed between the attachment part and the inner surfaces of this concavity in the arm part, for example.

Furthermore, the free end need not have an arm part, and instead, the side surface of the flat rectangular free end may be disposed in the space next to the attachment part, for example.

The shape of the free end is not limited to a rectangular shape, and may also be a diamond, a parallelogram, a trapezoid, a truss, or various other shapes.

The free end can be in a portion of the vibrator that is not fixedly attached to the attachment part; i.e., a portion other than the fixed part, and the space between the free end and the attachment part can be positioned in the substantial center of the free end instead of the end or side surface of the free end as in the previous embodiments.

Furthermore, in the second embodiment, a convexity 751 facing the free end FR was formed in the pressing plate 54 that was separate from the main plate 14 on which the vibrator 50 was fixedly attached, but the present invention is not limited thereto, and the opposing part that faces the free end may also be formed integrally with the member on which the attachment part is formed. For example, another possibility is to laterally insert a plate-shaped vibrator into a case that has a U-shape in cross section and that includes the attachment part, and to integrally form the opposing part that faces the free end of the vibrator inside the case.

In the previous embodiments, the thickness direction Z of the wristwatch 1 and the stacking direction of the piezoelectric elements 52, 53 and the reinforcing plate 51 were substantially the same, but the present invention is not limited thereto, and the piezoelectric elements and the reinforcing plate may also be stacked in the planar direction of the timepiece, for example.

The object driven by the piezoelectric actuator is not limited to a rotor that is rotatably driven, and may also be a driven object that is driven so as to move in linear fashion.

In the previous embodiments, a calendar mechanism of a wristwatch was depicted as an example of applying the piezoelectric actuator, but the present invention is not limited thereto, and the piezoelectric actuator of the present invention can also be applied as drive means for a seconds hand or other component that is driven almost continuously and turned by a greater amount per unit time than the calendar. The type of the timepiece is not limited to a wristwatch, and the present invention is also suitable for a personal pocket watch or the like.

Furthermore, aside from timepieces, the piezoelectric actuator of the present invention can also be suitably used in the zoom or auto-focus mechanisms of cameras, film winding mechanisms, paper rolling mechanisms in printers, and mechanisms for driving mobile toys such as cars or dolls. In other words, the piezoelectric actuator of the present invention is not limited to timepieces, and can also be incorporated into cameras, printers, mobile toys, and various other electronic devices.

Furthermore, the length, width, and other dimensions of the vibrating part depicted in the previous embodiments, as well as the lengths and widths of the fixed part and arm part as compared with the vibrating part are merely one example, and the characteristic frequency of the arm part may be appropriately determined according to the characteristic frequency or drive frequency of the vibrating part. Specifically, in the previous embodiments, the characteristic frequency of the arm part was 10 kHz as a value that is different from the characteristic frequency of the vibrating part, but the present invention is not limited thereto, and the characteristic frequency of the arm part can be made different from the characteristic frequency of the vibrating part by about 4% to 7% of the characteristic frequency of the longitudinal vibration in the vibrating part.

The terms "front," "back," "up," "down," "perpendicular," "horizontal," "slanted," and other direction-related terms used above indicate the directions in the diagrams used. Therefore, the direction-related terminology used to describe the present invention should be interpreted in relative terms as applied to the diagrams used.

"Substantially," "essentially," "about," and other terms that are used above and represent an approximation indicate a reasonable amount of deviation that does not bring about a considerable change as a result. Terms that represent these approximations should be interpreted so as to include a minimum error of about ±5%, as long as there is no considerable change due to the deviation.

This specification claims priority to Japanese Patent Application Nos. 2005-184454 and 2006-119951. All the disclosures in Japanese Patent Application Nos. 2005-184454 and 2006-119951 are incorporated herein by reference.

The embodiments described above are only some of possible embodiments of the present invention, but it is apparent to those skilled in the art that it is possible to add modifications to the above-described embodiments by using the above-described disclosure without exceeding the range of the present invention as defined in the claims. The above-described embodiments furthermore do not limit the range of the present invention, which is defined by the accompanying claims or equivalents thereof, and are designed solely to provide a description of the present invention.

The invention claimed is:

1. A piezoelectric actuator, comprising:
 a vibrator configured to vibrate by application of voltage, the vibrator having the piezoelectric elements and a reinforcing member that are stacked on each other,
 the reinforcing member having a free end that has the piezoelectric elements disposed thereon and that has a protuberance in contact with a driven object, and the reinforcing member having a fixed part that is fixedly attached to an attachment part to which the piezoelectric actuator is attached,
 the free end, when in a state in which no impact is applied to the attachment part from the outside, being disposed apart from to a first protrusion via prescribed first spaces that have specific dimensions, in order to limit displacement of the free end in the stacking direction of the piezoelectric elements and the reinforcing member,
 the fee end having an arm part on which a hole is formed,
 the attachment part having a second protrusion that extends towards the hole and that is inserted through the hole,
 the free end, when in a state in which no impact is applied from the outside, being disposed apart from the second protrusion via prescribed second spaces that have specific dimensions, in order to limit displacement of the free end in a planar direction being perpendicular to the stacking direction,
 the second spaces being formed between the second protrusion and the inner peripheral edge of the hole in the arm part.

2. The piezoelectric actuator according to claim 1, wherein the free end has a vibrating part that is provided with the fixed part on one side in the longitudinal direction, is formed into a flat substantially rectangular shape, and is made to vibrate in a mixed mode involving both longitudinal vibration that expands and contracts in a longitudinal direction, and bending vibration that bends in a transverse direction that intersects with the longitudinal direction, the arm part extends from the other side of the vibrating part in the planar direction of the vibrating part and is disposed on the attachment part via the spaces, and the arm part absorbs impact from outside to the piezoelectric actuator.

3. The piezoelectric actuator according to claim 2, wherein characteristic frequency of the arm part is different by a specific value from characteristic frequency of the longitudinal vibration of the vibrating part, and the characteristic frequency of the arm part is set in order not to interfere with the longitudinal vibration of the vibrating part.

4. The piezoelectric actuator according to claim 3, wherein the dimensions of the arm part are set so that the length of the arm part in the longitudinal direction of the vibrator is less than the length of the vibrator in the longitudinal direction; and the dimensional ratio for the length of the arm part is set so that the ratio of the length of the arm part to the width of the arm part in the transverse direction of the vibrating part is less than the ratio of the length of the vibrating part to the width of the vibrating part in the transverse direction.

5. The piezoelectric actuator according to claim 3, wherein the surface area obtained by multiplying the length of the arm part in the longitudinal direction of the vibrating part by the width of the arm part in the transverse direction of the vibrating part is less than the surface area of the vibrating part.

6. The piezoelectric actuator according to claim 2, wherein the arm part is provided in the vicinity of a node of the bending vibration in the vibrator.

7. The piezoelectric actuator according to claim 2, wherein the arm part is provided to the vibrating part via a constricted neck part that is on the side of the arm part and that connects to the vibrating part; and the neck part on the side of the arm part is provided in the vicinity of the node of ending vibration in the vibrating part.

8. The piezoelectric actuator according to claim 7, wherein the fixed part is provided to the vibrating part via a constricted neck part that is on the side of the fixed part and that connects to the vibrating part; and the neck part on the side of the fixed part is provided in the vicinity of the node of bending vibration in the vibrating part, at a position that faces the neck part on the side of the arm part in the transverse direction of the vibrating part.

9. The piezoelectric actuator according to claim 1, wherein the protrusion has a stepped part in the middle of the direction of protrusion; and the spaces are formed between the mutually opposing surfaces of the stepped part and the arm part.

10. The piezoelectric actuator according to claim 1, wherein the attachment part has an opposing part that faces the free end from a direction aligned with the stacking direction of the vibrator; and the spaces are formed between the opposing part and the vibrator.

11. The piezoelectric actuator according to claim 10, wherein the attachment part has a base member to which the vibrator is fixedly attached, and also has a plate member disposed on the other side of the vibrator across from the base member; and the opposing parts are provided at positions where the base member and the plate member face each other.

12. The piezoelectric actuator according to claim 1, wherein the driven object has a contact surface that is in contact with the protuberance, and the contact surface is formed into a substantially flat shape.

13. An electronic device, comprising the piezoelectric actuator according to claim 1.

14. The electronic device according to claim 13, wherein the electronic device is a timepiece having timekeeping means and a timekeeping information display unit for displaying the information timed by the timekeeping means.

15. A piezoelectric actuator, comprising:

a pair of piezoelectric elements having electrodes; and a reinforcing member configured between the pair of the piezoelectric elements, the reinforcing member having a protuberance in contact with a driven body, the protuberance configured to vibrate by application of voltage to the electrodes in order to drive the driven body, the reinforcing member having a free end and a fixed part, the free end extending away from the pair of piezoelectric elements in a first direction, the fixed part extending away from the pair of piezoelectric elements in a second direction being different from the first direction, the fixed part fixedly attached to an attachment part, the free end being adjacent to a first protrusion via a prescribed first space, in order to limit displacement of the free end in a stacking direction of the pair of the piezoelectric elements and the reinforcing member, the free end having a arm part, a hole being formed in the arm part, the attachment part having a second protrusion that extends towards the hole and that is inserted through the hole, in a state in which no impact is applied to the attachment part from the outside, being disposed apart from the second protrusion via a prescribed second space, in order to limit displacement of the fee end in a planar direction being perpendicular to the stacking direction, the second space being formed between the second protrusion and the inner peripheral edge of the hole in the arm part.

16. The piezoelectric actuator according to claim 15, wherein the displacement of the free end in the stacking direction is not limited, until the fee end touches the first protrusion, and the displacement of the free end in the planner direction is not limited, until the fee end touches the second protrusion.

* * * * *

UNITED STATES PATENT AND TRADEMARK OFFICE
CERTIFICATE OF CORRECTION

PATENT NO.         : 7,583,564 B2
APPLICATION NO. : 11/473307
DATED              : September 1, 2009
INVENTOR(S)       : Kitahara et al.

Page 1 of 1

It is certified that error appears in the above-identified patent and that said Letters Patent is hereby corrected as shown below:

On the cover page change item [75] Inventors from

"[75] Inventors: Joji Kitahara, Suwa (JP);
                Akihiro Sawada, Matsumoto (JP)"

to

-- [75] Inventors: Joji Kitahara, Shiojiri (JP);
                Akihiro Sawada, Matsumoto (JP) --

Signed and Sealed this

Twenty-fourth Day of November, 2009

David J. Kappos
*Director of the United States Patent and Trademark Office*